United States Patent [19]

Hocutt et al.

[11] 4,298,361
[45] Nov. 3, 1981

[54] ROTARY DRUM FILTER STRIPPER NOZZLE MOUNTING

[75] Inventors: Hovan Hocutt; David M. Ford, both of Charlotte, N.C.

[73] Assignee: Pneumafil Corporation, Charlotte, N.C.

[21] Appl. No.: 151,344

[22] Filed: May 19, 1980

[51] Int. Cl.³ .............................................. B01D 46/04
[52] U.S. Cl. ........................................ 55/290; 55/294
[58] Field of Search ......................... 55/290, 294, 302; 210/393

[56] References Cited

U.S. PATENT DOCUMENTS

| | | | |
|---|---|---|---|
| 2,473,501 | 6/1949 | Bahnson, Jr. | 55/290 |
| 3,306,012 | 2/1967 | Wallin | 55/294 |
| 3,499,267 | 3/1970 | King, Jr. et al. | 55/290 |

Primary Examiner—David L. Lacey
Attorney, Agent, or Firm—Robert W. Fiddler

[57] ABSTRACT

A nozzle mounting for the stripper nozzle employed for cleaning the filter media of rotary drum filters. The improved mounting is formed by a stripper duct having a stationary portion and a traversing portion telescoping with respect to said stationary portion, and mounted adjacent the drum filter along a line parallel to the axis of the drum filter. The traversing portion of the duct is coupled to and supports a plurality of equally spaced nozzles, and this traversing duct portion is mounted for reciprocation a distance equal to the spacing between the nozzles so that upon reciprocation of the traversing duct portion, each nozzle will be moved across the media surface rotating with the drum to strip waste therefrom, so that all areas of the media will be cleaned.

8 Claims, 3 Drawing Figures

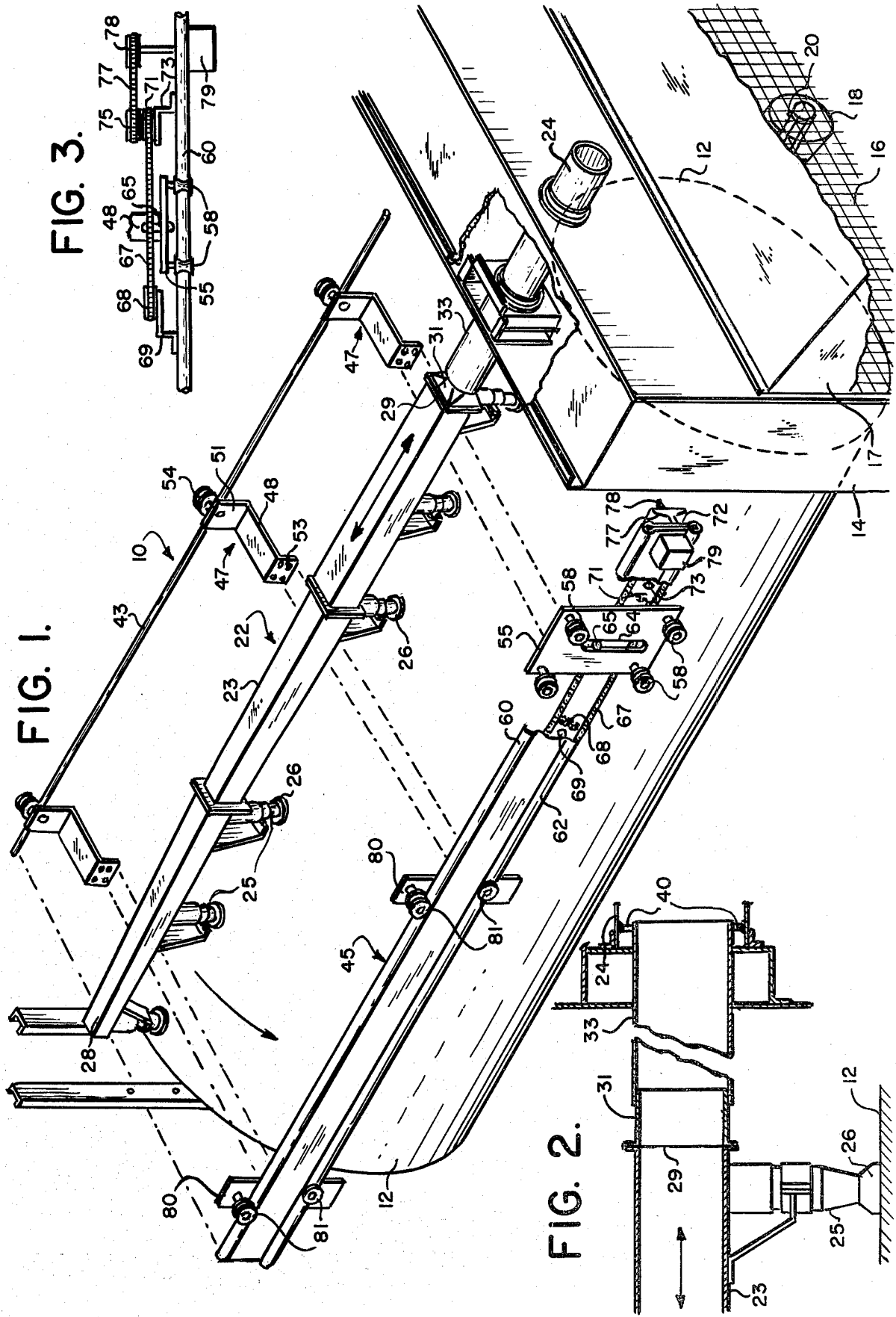

ROTARY DRUM FILTER STRIPPER NOZZLE MOUNTING

BACKGROUND OF THE INVENTION

This invention relates to the art of rotary drum filters, and more particularly, to an improved means for stripping, or cleaning the filter media supported on the drum.

Rotary drum filters formed of a rotating cylindrical configuration have long been known, in which the surface of the drum is formed by screening supporting a porous filter medium through which dirt laden air or the like is passed, with the air passing through the filter medium from the exterior of the cylinder, with the undesired material to be removed from the air, filtered out on the exterior surface of the medium. With time, the medium becomes clogged, and the foreign matter must be stripped from the medium to permit continuance of filtration. To this end, one or more nozzles have in the past been arranged for movement over the surface of the medium as the drum is rotated, with the nozzles connected to a suction source, so as to strip or clean foreign matter from the medium.

These nozzles have in the past been connected to the suction source by means of a flexible tube, so that the nozzle can be moved back and forth with respect to the drum.

However, where particulate matter filtered out on the medium is of an abrasive nature, conventional materials, such as employed in the formation of flexible tubing are subject to abrasive deterioration under the action of the filtered material being removed. Further, the flexible tubing must be kept away from the filter surface to prevent damage thereof.

BRIEF DESCRIPTION OF THE INVENTION

It is with the above considerations in mind, that the present, improved nozzle mounting has been evolved, serving to provide a relatively rigid abrasion resistant duct for connecting the stripper nozzles of a rotary drum filter to a suction source.

It is accordingly among the primary objects of this invention to provide abrasion resistant means for interconnecting the stripper nozzles of a rotary drum cleaner with a suction source.

Another object of the invention is to provide an abrasion resistant structure for connecting the rotary drum filter stripper nozzles to a suction source, which will not interfere with desired movement of the stripper nozzles over the filter medium.

These and other objects of the invention which will become hereafter apparent, are achieved by providing a stripper duct of relatively rigid abrasion resistant material, and mounting this duct along an axis parallel to, but spaced from the axis of the rotary drum filter in connection with which the stripper is to be employed. A plurality of uniformly spaced stripper nozzles are extended from the duct, and the duct is formed with a stationary portion and a traversing portion, telescopically supported with respect to the stationary portion connected to the source of suction. A seal is formed between the stationary duct portion, and the traversing nozzle bearing telescoping duct portion. The length of the reciprocating path of the reciprocating duct is equal to the spacing between the stripper nozzles, thus insuring that all surfaces of the filter are subjected to required stripping suction.

A feature of the invention resides in the fact that the use of relatively rigid walled ductwork between the stripping nozzles and the suction source serves to eliminate the deterioration usually encountered when flexible hoses are employed for this purpose.

Another feature of the invention resides in the elimination of any interference with the desired filtering operation resulting when flexible hoses were employed which, as a result of nozzle movement, may cause the flexible hose to flex into contact with the filter medium serving to damage same.

BRIEF DESCRIPTION OF THE DRAWINGS

The particular details of the best mode contemplated for carrying out the invention and of the manner and process for making and using same, so as to enable those skilled in the art to practice the invention, will be described in full, clear, concise and exact terms, in conjunction with the accompanying drawings, wherein:

FIG. 1 is a perspective schematic view of a rotary drum filter with a stripper nozzle mounting made in accordance with the teachings of the invention, with the mounting support components shown in exploded view;

FIG. 2 is a partial schematic cross-sectional elevational view through the duct and a nozzle of FIG. 1; and FIG. 3 is a partial schematic view looking from the top of a drive for the traversing duct portion.

DESCRIPTION OF PREFERRED EMBODIMENT OF THE INVENTION

As best seen in FIG. 1, the drum filter nozzle mounting 10 is arranged over the drum 12 of a rotary drum filter, of a type in which the drum 12 formed of a screen material is covered with filter media generally of relatively fine porosity, such for example as filter paper, or any one of a large variety of conventionally available and used sheet filter materials, whether formed of felted fiberglass, paper, cellulose, synthetics, or the like. The drum 12 is supported for rotation about its longitudinal axis, with one end closed (the end to the left in the illustration) and the other end open (the end to the right in the drawing) with air flow from the exterior of the drum 12 through the filter media to the interior of the drum, and out through the open end. Discharge plenum 14 is formed over the open end of drum 12 to receive filtered air from the drum, which is discharged through the screened plenum outlet opening 16, shown as covered by hood 17. Filter drum 12 is mounted for rotation about its axis, and motor 18 arranged in the filter discharge plenum 14 is coupled via belt 20 to a pulley on a supporting shaft for the drum 12.

In accordance with the illustrated embodiment, stripper duct 22, formed of a relatively rigid sheet material such as steel, plastic or the like, is arranged along the drum at a spaced distance therefrom. Stripper duct 22 has a traversing duct portion 23, and a stationary duct portion 24 (to the right in FIG. 1). A plurality of equally spaced suction nozzles 25 are supported from the traversing duct portion 23 of duct 22, with nozzles 25 preferably contoured as shown, positioned with nozzle intake ends 26 in sliding contact with the filter medium supported on the filter drum. The traversing duct portion 23, as shown is contoured of a rectangular cross-section, at least along the duct section to which the nozzles are connected, with one end of the duct of greater cross-sectional area than the other, i.e., tapering from a relatively smaller closed end 28 (to the left in FIG. 1) to a relatively larger open end 29 transitions via transition piece 31 to a right circular cylindrical traversing duct section 33, which telescopes (as best seen in FIG. 2) into stationary duct portion 24, which leads to the suction side of a fan (not shown).

In the illustrated embodiment, the stationary duct portion 24 is preferably extended through the drum filter discharge plenum 14 to a suction source (not shown) formed by a conventional fan, blower, or the like, and a seal 40, as best seen in FIG. 2, if formed between the outer wall of the cylindrical section 33 of the traversing duct portion 23 and the interior wall of the cylindrical stationary duct portion 24.

The traversing duct portion 23 is illustratively shown as supported between an idler track 43 and a drive track 45, arranged on opposite sides of the traversing duct 23. Duct support brackets 47 are formed of a shape as illustrated in FIG. 1 with a horizontal plate part 48 underlying the traversing duct portion 23, and a vertically extending idler wheel supporting plate part 51, and a vertically extending drive plate engaging flange 53.

Idler wheel 54 is rotatably supported on plate part 51 and is dimensioned to ride on idler track 43.

A main vertically extending drive plate 55, as seen to the right in FIG. 1 (and in FIG. 3) is secured to flange 53 of support bracket 47 closest to the drum plenum 14 and is formed with a pair of upper drive wheels and lower drive wheels 58, which ride on upper and lower rails 60 and 62 of drive track 45. Main drive plate 55 is formed with a slideway 64 accommodating drive pin 65, which is secured to driven sprocket chain 67 trained over idler sprocket wheel 68 rotatably supported on bracket 69 and driven sprocket wheel 71 rotatably supported on bracket 73 (as best seen in FIG. 3). Driven sprocket wheel 71 is formed on a shaft coaxially with auxiliary driven sprocket wheel 75, which is driven by drive sprocket chain 77 trained over drive sprocket wheel 78 on the shaft of motor 79, which is supported on the track plate 72 between drive track rails 60 and 62.

Auxiliary drive plates 80 are secured to the flanges 53 of support brackets 47 spaced from the main drive plate support bracket (to the left as viewed in FIG. 1), and guide wheels 81 are rotatably supported on the plates riding on drive rails 60 and 62.

OPERATION

The above described filter components are fabricated employing conventional metal forming and assembling techniques, with the nozzle supporting duct preferably formed of sheet metal shaped as described and illustrated of rectangular cross-section, with nozzles 25 secured thereto with free air passage from intake ends 26 of the nozzle through the nozzle and traversing duct portion 23, and stationary duct portion 24 to a suction source (not shown) formed by a fan or blower.

In use, after assembly as above described, and illustrated in the drawings, the drum 12 is covered with suitable filter media, and installed in an area where it is desired to remove air borne matter from the atmosphere. The drum is set into rotation beneath the nozzles 25, which are moved linearly along an axis parallel to the drum axis to traverse the filter media surface. This traversing movement of the nozzles is imparted thereto by the reciprocating movement of traversing portion 23 of duct 22, which is illustratively shown as driven by driven sprocket chain 67. As will be understood by those skilled in the art, a variety of reciprocating drive mechanisms may be employed, however, as illustratively shown (as best seen in FIG. 3), motor 79 rotates drive sprocket wheel 78 to rotate drive sprocket chain 77, causing driven sprocket wheel 71 to rotate, imparting motion to driven sprocket chain 67, which causes drive pin 65 riding in drive plate slideway 64 to move drive plate 55. Thus, as the drive pin 65 is moved along by sprocket chain 67, it forces plate 55 to traverse on drive track 45, with slideway 64 accommodating movement of pin 65 from the upper to the lower run of sprocket chain 67, with movement of the pin from one chain run to the other, producing reversal of the plate. Chain 67 is selected of a length such as to produce a reciprocating traverse of the plate 55 at least equal to the spacing between the furthest apart nozzles 25, it being preferred that the nozzles be equally spaced on the duct portion 23.

The traversing duct portion 23 coupled to drive plate 55 by support bracket 47, reciprocates with the plate 55. The air flow path between the traversing duct portion 23 and the stationary duct portion 24, is relatively sealed by the seal 40 arranged as shown in FIG. 2 between the exterior of the traversing duct portion 23 and the interior of the stationary duct, to minimize leakage resulting from the relatively movement of the duct portions.

The above disclosure has been given by way of illustration and elucidation, and not by way of limitation, and it is desired to protect all embodiments of the herein disclosed inventive concept within the scope of the appended claims.

What is claimed is:

1. In a rotary drum filter in which a rotating cylindrical drum is provided with a filter surface through which air passes from the exterior to the interior of the drum, and at least one nozzle is positioned to move over the filter surface to strip foreign matter accumulating thereon, a mounting for the at least one nozzle, said mounting comprising an elongate relatively rigid walled duct extending along an axis spaced from and parallel to the drum axis; a stationary portion of said duct mounted at one end of the drum; and a traversing portion of said duct mounted along the drum and telescoping with respect to said stationary portion, said traversing portion supporting the at least one nozzle, and drive means coupled to said traversing portion to effect movement thereof.

2. In a rotary drum filter as in claim 1, wherein the at least one nozzle comprises a plurality of equally spaced nozzles supported on said traversing duct portion.

3. In a rotary drum filter as in claim 2, in which said traversing duct portion is constructed and arranged to traverse a distance at least equal to the spacing between the adjacent nozzles.

4. In a rotary drum filter as in claim 2, in which said traversing duct portion is of a rectangular cross-section, as viewed in a direction transverse to its longitudinal axis.

5. In a rotary drum filter as in claim 4, in which said traversing duct portion is of a tapering configuration increasing in cross-sectional area from a relatively smaller closed end to a relatively larger open end.

6. In a rotary drum filter as in claim 5, in which the relatively larger open end of said traversing duct transitions to a right circular cylindrical duct section telescoping into said stationary portion of said duct.

7. In a rotary drum filter as in claim 6, in which said stationary duct portion is of a right circular cylindrical configuration.

8. In a rotary drum filter as in claim 7, in which an annular flexible seal is formed between the outer surface of the cylindrical section of said traversing duct and the interior surface of said stationary duct portion.

* * * * *